(12) United States Patent
Marinca (10) Patent No.: US 7,372,244 B2
(45) Date of Patent: May 13, 2008

(54) TEMPERATURE REFERENCE CIRCUIT

(75) Inventor: Stefan Marinca, Dooradoyle (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/716,842

(22) Filed: Mar. 12, 2007

(65) Prior Publication Data

US 2007/0170906 A1    Jul. 26, 2007

Related U.S. Application Data

(62) Division of application No. 10/756,155, filed on Jan. 13, 2004, now Pat. No. 7,211,993.

(51) Int. Cl.
*G05F 3/16* (2006.01)
*G05F 3/02* (2006.01)
*G05F 1/40* (2006.01)

(52) U.S. Cl. ..................... 323/316; 327/539

(58) Field of Classification Search ........ 323/313–317; 327/535, 537, 538, 539, 543
See application file for complete search history.

(56) References Cited

U.S. PATENT DOCUMENTS

| | | | |
|---|---|---|---|
| 4,603,291 A | 7/1986 | Nelson | |
| 4,808,908 A | 2/1989 | Lewis et al. | |
| 4,896,094 A * | 1/1990 | Greaves et al. | 323/314 |
| 4,897,595 A * | 1/1990 | Holle | 323/314 |
| 4,939,442 A | 7/1990 | Carvajal et al. | |
| 5,053,640 A | 10/1991 | Yum | |
| 5,126,653 A | 6/1992 | Ganesan et al. | |
| 5,325,045 A | 6/1994 | Sundby | |
| 5,352,973 A | 10/1994 | Audy | |
| 5,424,628 A | 6/1995 | Nguyen | |
| 5,512,817 A | 4/1996 | Nagaraj | |
| 6,121,824 A | 9/2000 | Opris | |
| 6,157,245 A | 12/2000 | Rincon-Mora | |
| 6,218,822 B1 | 4/2001 | MacQuigg | |
| 6,292,050 B1 * | 9/2001 | Dooley et al. | 327/540 |
| 6,304,109 B1 * | 10/2001 | Brokaw | 327/73 |
| 6,605,987 B2 | 8/2003 | Eberlein | |

(Continued)

FOREIGN PATENT DOCUMENTS

WO   WO 2004/077192   9/2004

OTHER PUBLICATIONS

PCT/EP2005/050047, International Search Report, May 12, 2005.

(Continued)

*Primary Examiner*—Matthew V. Nguyen
(74) *Attorney, Agent, or Firm*—Wolf, Greenfield & Sacks P.C.

(57) ABSTRACT

The invention provides a temperature reference circuit that is adapted to provide a $\Delta V_{be}$ of sufficiently large value that no amplification is required, and therefore any offset contribution is not gained. Using a stacked arrangement of three pairs of transistors, the invention reduces the requirement for multiple resistors within a circuit and can therefore minimize errors due to resistor matching and value. By driving at least some of the transistors with a proportional to absolute temperature (PTAT) current it is possible to ensure that the $\Delta V_{be}$ as a temperature sensitive variable.

17 Claims, 6 Drawing Sheets

U.S. PATENT DOCUMENTS

| | | | |
|---|---|---|---|
| 6,614,209 B1 | 9/2003 | Gregoire, Jr. | |
| 6,690,228 B1 * | 2/2004 | Chen et al. | 327/538 |
| 6,828,847 B1 | 12/2004 | Marinca | |
| 6,958,643 B2 * | 10/2005 | Rosenthal | 327/540 |
| 7,113,025 B2 * | 9/2006 | Washburn | 327/539 |
| 7,193,454 B1 * | 3/2007 | Marinca | 327/539 |
| 2002/0067202 A1 | 6/2002 | Eberlein | |
| 2005/0151528 A1 | 7/2005 | Marinca | |

OTHER PUBLICATIONS

Pertijs, M.A.P. et al, "A high-accuracy temperature sensor with second-order curvature correction and digital bus interface", ISCAS 2001-Proceedings of the 2001 IEEE international symposium on circuits and systems, Sydney, Australia, May 6-9, 2001; IEEE, vol. 1 of 5, May 6, 2001, pp. 368-371.

* cited by examiner

TEMPERATURE REFERENCE CIRCUIT

CROSS-REFERENCE TO RELATED APPLICATION

This application is a divisional of U.S. patent application Ser. No. 10/756,155, entitled LOW OFFSET BANDGAP VOLTAGE REFERENCE, filed Jan. 13, 2004, now U.S. Pat. No. 7,211,993, and is incorporated by reference.

FIELD OF THE INVENTION

The present invention relates to temperature reference circuits and in particular to a voltage based temperature reference circuit implemented using bandgap techniques.

BACKGROUND

A bandgap voltage reference circuit is based on addition of two voltages having equal and opposite temperature coefficients, TC. The first voltage is a base-emitter voltage of a forward biased bipolar transistor. This voltage has a negative TC of about −2.2 mV/C and is usually denoted as a Complementary to Absolute Temperature or CTAT voltage. The second voltage which is Proportional to Absolute Temperature, or a PTAT voltage, is formed by amplifying the voltage difference ($\Delta V_{be}$) of two forward biased base-emitter junctions of bipolar transistors operating at different current densities. More information on bandgap voltage reference circuits including examples of prior art methodologies can be found in U.S. application Ser. No. 10/375,593 of Stefan Marinca as filed on 27$^{th}$ Feb. 2003, the contents of which are incorporated herein by reference.

It will be understood that for a pair of bipolar transistors operating at collector current densities in a ratio of 1/50 $\Delta V_{be}$ is of the order of about 100 mV at room temperature. As a CTAT voltage is typically of the order of about 700 mV it will be appreciated that the $\Delta V_{be}$ needs to be amplified by an order of about 5, in order to balance the CTAT voltage. However this amplification of the $\Delta V_{be}$ voltage has the effect of including offset voltages into the PTAT voltage and as a result the reference voltage precision may be affected. These errors are greater when the circuitry is implemented using CMOS processes as opposed to similar circuits implemented using bipolar techniques. Such difference in performance can be traced to the fact that in simple CMOS processes only parasitic bipolar transistors are available and amplifiers based on MOS transistors have larger input voltage offsets.

Figure 1:
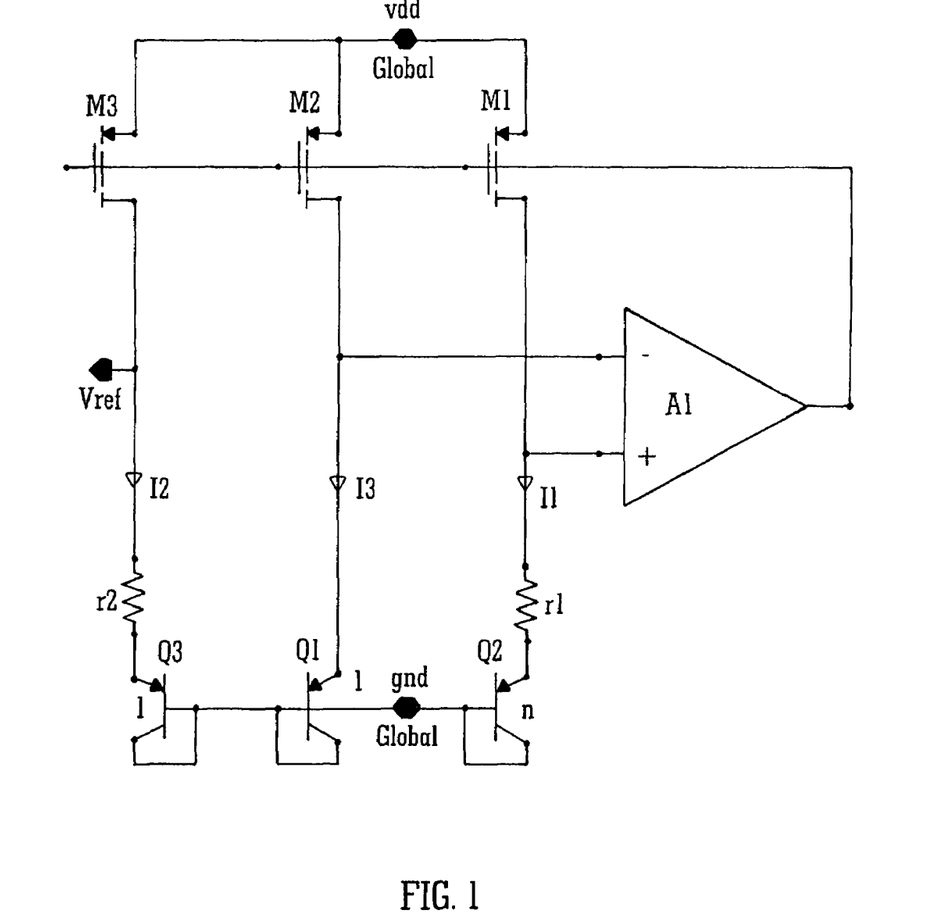
FIG. 1 is an example of a typical prior art configuration of a bandgap voltage reference circuit provided in CMOS technology.

FIG. 1 is an example of a conventional CMOS implemented bandgap voltage reference. Three pMOS transistors M1, M2 and M3 are provided, each having the same aspect ratio of width/length (W/L). A first and second bipolar transistor Q1 and Q2 are provided, with Q2 having a larger emitter area as compared to Q1. As a result Q1 and Q2 operate at a different current density (the emitter currents are the same for both). An amplifier A1, which is coupled to both Q1 and Q2 keeps the two input levels at the same value and as a result a voltage, $\Delta V_{be}$, is developed across a resistor r1. $\Delta V_{be}$ is of the form $$\Delta V_{be} = (kT/q)(\ln(n)) \tag{1}$$

where k is the Boltzmann constant,
q is the charge on the electron,
T is the operating temperature in Kelvin, n is the collector current density ratio of the two bipolar transistors.

The voltage reference Vref provided by the circuit can be determined as the base-emitter voltage of Q3 plus the voltage drop over r2.

$$\text{Vref} = V_{be}Q3 + (r2/r1)(\Delta V_{be}) \tag{2}$$

The scale value of r2/r1 is chosen to be about 5, and as a result the amplifer offset voltage is also amplified by about a factor of 6, as the input offset voltage is gained to the output by a factor of 1+r2/r1. It will therefore be understood that for each 1 mV input voltage offset an error of about 6 mV is reflected into the bandgap reference. One way to reduce this offset sensitivity is to stack the bipolar transistors. The stacking is however limited by the available headroom—most circuits have to operate from an available 2.6V supply voltage and as a result the number of stacks is typically limited to 2 or 3. Therefore although it is know to stack transistors at the input to the amplifier so as to generate a multiple value of $\Delta V_{be}$, as this is generated across the resistor at the input to the amplifier there is still an offset contribution that is gained by the circuitry.

A further source of error in bandgap voltage reference circuits can be traced to resistor mismatch. As will be evident from an examination of the terms in equation two, any error in the resistor ratio is directly translated into the reference voltage. It would therefore be desirable to minimise this source of error.

Yet another source of error can be traced to what is commonly called "curvature". This is a second order error component. In a bipolar transistor the base-emitter voltage biased at a PTAT collector current can be given by:

$$V_{be}(T) = V_{G0}\left(1 - \frac{T}{T_0}\right) + V_{be0}\frac{T}{T_0} - (\sigma - 1)\frac{kT}{q}\ln\left(\frac{T}{T_0}\right) \tag{3}$$

where:

$V_{be}(T)$ is the temperature dependence of the base-emitter voltage for the bipolar transistor at operating temperature, $V_{be0}$ is the base-emitter voltage for the bipolar transistor at a reference temperature, $V_{G0}$ is the bandgap voltage or base-emitter voltage at 0K, $T_0$ is the reference temperature, and $\sigma$ is the saturation current temperature exponent.

The last term of equation three contributes the curvature, and ideally would be minimised.

An example of an implementation of a bandgap circuit in an environment having low operational voltages is provided in U.S. Pat. No. 6,605,987 assigned to Infineon Technologies, AG. This describes the use of lateral transistors for generating a first partial current which has a first temperature dependence. These lateral transistors form an asymmetric input pair of an amplifier and their collector currents drive a second pair of MOS transistors. Due to the coupling of the lateral transistors to the MOS transistors, it is necessary for the MOS transistors to operate at low threshold voltages, which requires implementation using special CMOS processes. Additionally, the circuit requires the use of multiple is resistors, the resistors requiring matching therebetween. Although this circuit is advantageous in environments having only low operational voltages available, it is not suitable for all applications as the requirements for the resistor matching and implementation of the MOS transistors is arduous.

An example of an implementation of a bandgap reference circuit that is specifically designed to reduce the number of resistors utilised is given in U.S. Pat. No. 6,614,209 of Gregoire, Jr. This describes a bandgap reference circuit utilising multiple PTAT sources coupled in series to generate a final PTAT voltage. A current biased base-emitter region of a bipolar transistor is coupled between the final PTAT voltage and an output terminal of the bandgap voltage reference so as to add the base emitter voltage to the final PTAT voltage thereby generating a stable voltage reference. Although this approach enables a reduction in the resistor ratio traditionally used in bandgap circuits it suffers from a number of drawbacks. As the circuit does not provide for curvature correction it is necessary to generate a large $\Delta V_{be}$ (PTAT) in order to balance the base-emiter voltage (CTAT). U.S. Pat. No. 6,614,209 achieves this balancing by using a two-stage architecture as shown in FIG. 5 of the patent. The required PTAT voltage is provided by the combination of an initial PTAT source, referenced as block 510, and a terminal PTAT source, referenced as block 530, both including amplifiers. Due to the configuration of the circuitry, the second amplifier requires a high headroom environment to operate effectively as its two inputs have a common voltage which is about 3 $\Delta V_{be}$ (approximately 330 mV at room temperature) compared to that of the first amplifier. This limits the applications where this bandgap voltage reference can be utilised. Secondly, the requirement for two amplifiers increases the area required and the power supply needed on a die for implementation of such a circuit. Furthermore as there is no curvature correction provided to the reference the precision of the reference voltage provided is limited. Additionally, as two amplifiers are used the contribution to offset and noise is increased.

There is therefore a need to provide a bandgap voltage reference circuit that can be used as a temperature sensor, i.e. is sensitive to temperature fluctuations.

SUMMARY

These and other problems associated with the prior art techniques are addressed by circuits and methodologies in accordance with the present invention. In accordance with a first embodiment of the invention, a temperature reference circuit is provided. Such a circuit includes an amplifier having at its non-inverting input node at least one bipolar transistor operable at a first current density and in a feedback loop between the output of the amplifier and its inverting input node, at least one bipolar transistor operable at a second current density lower then that of the transistor coupled to the non-inverting input, such that due to the difference in current density of the transistors coupled to each of the two inputs a $\Delta V_{be}$ is reflected at the output of the amplifier and wherein the transistors coupled to each of the input nodes of the amplifier are driven with PTAT currents such that the $\Delta V_{be}$ voltage developed is temperature sensitive, thereby providing a voltage reference circuit adapted to provide a measurement of temperature.

Such a circuit desirably generates a sufficiently high value of $\Delta V_{be}$ to reduce the need for amplification and thereby obviates the problems of inherent errors being amplified within the circuit. Stacks of transistors are provided at the input to an amplifier and a sole resistor is provided at the output of the amplifier, and is used to generate the required $\Delta V_{be}$. It will be appreciated that by providing the resistor at the output as opposed to the input of the amplifier, that errors due to amplification of the offset of the amplifier is obviated. Also by using a single resistor the errors due to the multiple resistors mismatches are eliminated.

By providing an amplifier having at its non-inverting input a first stack of bipolar transistors operating at first current density and providing in a feedback loop between the amplifier output and its inverting input a second stack of bipolar transistors operating at second current density lower then that of first stack, differences in current density between the two stacks an enhanced $\Delta V_{be}$ is reflected at the output of the amplifier, this enhanced $\Delta V_{be}$ being developed across a resistor coupled between the output of the amplifier and a reference potential. By adding this PTAT voltage to a balanced CTAT voltage the circuit may be modified to generate a voltage reference insensitive to the temperature. If the PTAT voltage is not superimposed or combined with a balanced CTAT voltage then the circuit provides at the output of the amplifier a value indicative of the temperature in the circuit, a temperature sensor.

Desirably, three pairs of transistors are provided, each of the pairs contributing a $\Delta V_{be}$ component, such that the enhanced $\Delta V_{be}$ generated across the resistor at the output of the amplifier is equivalent to $3\Delta V_{be}$.

In order to maximise the effect of the contribution of the $3\Delta V_{be}$, the circuit is preferably further adapted to generate a curvature correction voltage. This curvature correction voltage may be provided by driving each of the three transistors operating at the first current density with a Proportional to Absolute Temperature (PTAT) current and the other three transistors with a constant current, the sum of the curvature correction voltage and the $3\Delta V_{be}$ being both applied across the resistor on the output of the amplifier, thereby correcting for curvature associated with the bandgap circuit.

The generation of the PTAT current is effected preferably by mirroring the current defined across the resistor on the output of the amplifier so as to drive each of the transistors operating at the first current density.

In certain configurations each of the transistors are provided in a MOS process implementation, and in other configurations or embodiments certain of the transistors are provided in a bipolar implementation. This latter implementation can, it will be appreciated, be provided using CMOS processes as well.

Certain embodiments may require two of the pairs of transistors to be formed using bipolar transistors and the third pair to be formed using lateral transistors. In such embodiments, the third pair may provide an input stage of the amplifier. Such an input stage is desirably provided as an asymmetric input stage of the amplifier.

The circuit may additionally include a pair of load transistors coupled to the third pair of transistors, the load transistors being adapted to equalise the currents through the third pair of transistors.

In certain embodiments, the third pair of transistors are both driven with a PTAT current. Such a PTAT current may be generated externally to the circuit.

Certain configurations may provide a second stage of the amplifier using a MOS transistor which is driven by a PTAT current source, the MOS transistor being coupled to one of the load transistors and the collector of one of the transistors forming the third pair of transistors.

The circuit may, in some embodiments, include a MOS transistor provided at the output of the amplifier, the MOS transistor being driven with a PTAT current, the base of the MOS transistor being coupled directly to the output node of the amplifier and the emitter node providing an output of the circuit. In such embodiments, the source of the MOS transistor may be coupled to the emitter of a bipolar transistor, the collector of the bipolar transistor being coupled to a reference potential, and the base of the bipolar transistor being coupled to the resistor.

Alternative embodiments may provide each of the three pairs of transistors in a bipolar configuration, the third pair providing an input stage of an amplifier, the amplifier having an output node coupled to a bipolar transistor provided in a voltage follower configuration, and wherein the voltage reference is provided at a node between the output of the amplifier and the voltage follower.

These and other features of the invention will be better understood with reference to the following drawings which are of exemplary embodiments of the invention and are not intended to be construed as limiting in any manner. As will be appreciated by those skilled in the art, modifications and adaptations can be made to the exemplary embodiments described below without departing from the spirit and scope of the invention.

BRIEF DESCRIPTION OF THE DRAWINGS

The present invention will now be described with reference to the accompanying drawings in which.

DETAILED DESCRIPTION OF THE DRAWINGS

The prior art has been described with reference to FIG. 1.

Figure 2:
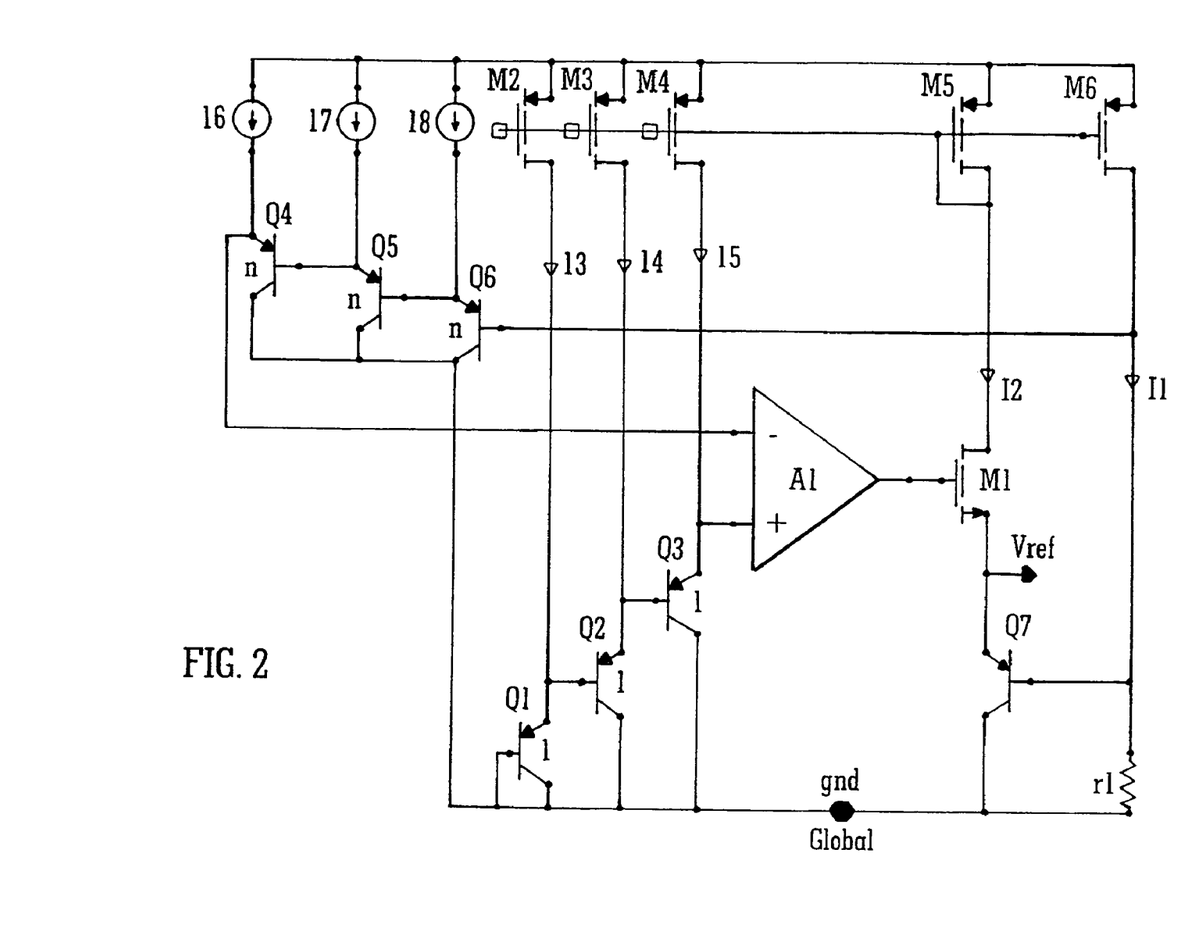
FIG. 2 is an example of a circuit according to a first embodiment of the present invention.

FIG. 2 is an example of a bandgap voltage reference in accordance with the present invention which can be used as a temperature reference circuit.

The circuit includes an amplifier A1, which in accordance with standard techniques, is adapted to keep its two inputs (an inverting and a non-inverting input) at substantially the same level. The operation of an amplifier will be well known to those skilled in the art and for the sake of convenience will not be explained herein. A first Q1, second Q2 and third Q3 transistor are coupled to the non-inverting input of the amplifier and a corresponding set of three transistors Q4, Q5 and Q6 are coupled to the inverting input. Each of these sets of three transistors may be considered as forming a chain of transistors coupled to their respective input nodes. The emitter areas of Q4, Q5 and Q6 are each "n" times that of Q1, Q2 and Q3.

Q1, Q2 and Q3 are arranged such that the emitter of Q1 is coupled to the base of Q2, the emitter of Q2 to the base of Q3 and the emitter of Q3 to the non-inverting input of the amplifier. Similarly, the base of Q4 is coupled to the emitter of Q5, the base of Q5 to the emitter of Q6 and the emitter of Q4 to the inverting input of the amplifier A1. The collectors of each of the transistors are tied to ground. As such when the bipolar transistors are biased with appropriate currents, a difference in base-emitter voltage is developed from the bipolar stack operating at high current density (Q1, Q2, Q3) to the bipolar stack operating at low current density (Q4, Q5, Q6). Each of the pairings contribute a $\Delta V_{be}$, and when combined a $3\Delta V_{be}$ difference is provided.

At the output of the amplifier, a first nMOS transistor M1 is provided. The gate of the device M1 is coupled to the output of the amplifier. The drain of M1 is coupled to a diode connected pMOS transistor M5. The reference voltage, Vref, of the circuit, is provided at a node between the source of M1 and the emitter of another transistor Q7. The base of Q7 is coupled to the drain of a further pMOS transistor M6, and across a resistor r1 to ground. The gates of M6 and M5 are commonly coupled and are further coupled to the gates of three further pMOS transistors M2, M3 and M4, the sources of which are coupled to a supply voltage and the drains of which are coupled to the emitters of Q1, Q2 and Q3, thereby providing currents I3, I4 and I5 respectively. Constant currents I6, I7 and I8 are provided at the emitters or Q4, Q5 and Q6 respectively.

Due to the respective differences between the emitter areas of Q1/Q4, Q2/Q5 and Q3/Q6 a difference of three $\Delta V_{be}$ is reflected across r1. It will be appreciated that the presence of this sole resistor coupled at the output of the amplifier is sufficient to generate the desired three $\Delta V_{be}$. As a result, the currents I1 and I2, which are mirrored by M5 and M6, are PTAT currents. Similarly the currents I3, I4 and I5, which are forced into the transistors Q1, Q2 and Q3, are also PTAT currents. As mentioned above, the currents I6, I7 and I8 forced into the bipolar transistors Q4, Q5 and Q6, which are operating at a lower current density than Q1, Q2 or Q3 are constant currents. For each respective pair of transistors, a negative curvature voltage is developed of the type:

$$V_{curv}=(kT/q)(\ln(T/T_0)) \quad (4)$$

The PTAT voltage ($3\Delta V_{be}$) and the sum of the three combined curvature voltages are both applied across r1. As Q7 is also biased at PTAT, the reference voltage will be equal to $V_{G0}$ with the curvature removed.

It will be understood, that by stacking three pairs of transistors on each of the inputs legs to the amplifier a $3\Delta V_{be}$ voltage is generated and by biasing the three bipolar transistors operating at high current density with PTAT current and the bipolar transistors operating at low current density with constant current an internal curvature correction mechanism within the circuit is developed.

It will also be understood that the amplifier's offset voltage is only reflected across r1, and as r1 is on the output of the amplifier that this offset voltage is not gained or amplified by the amplifier.

Figure 3:
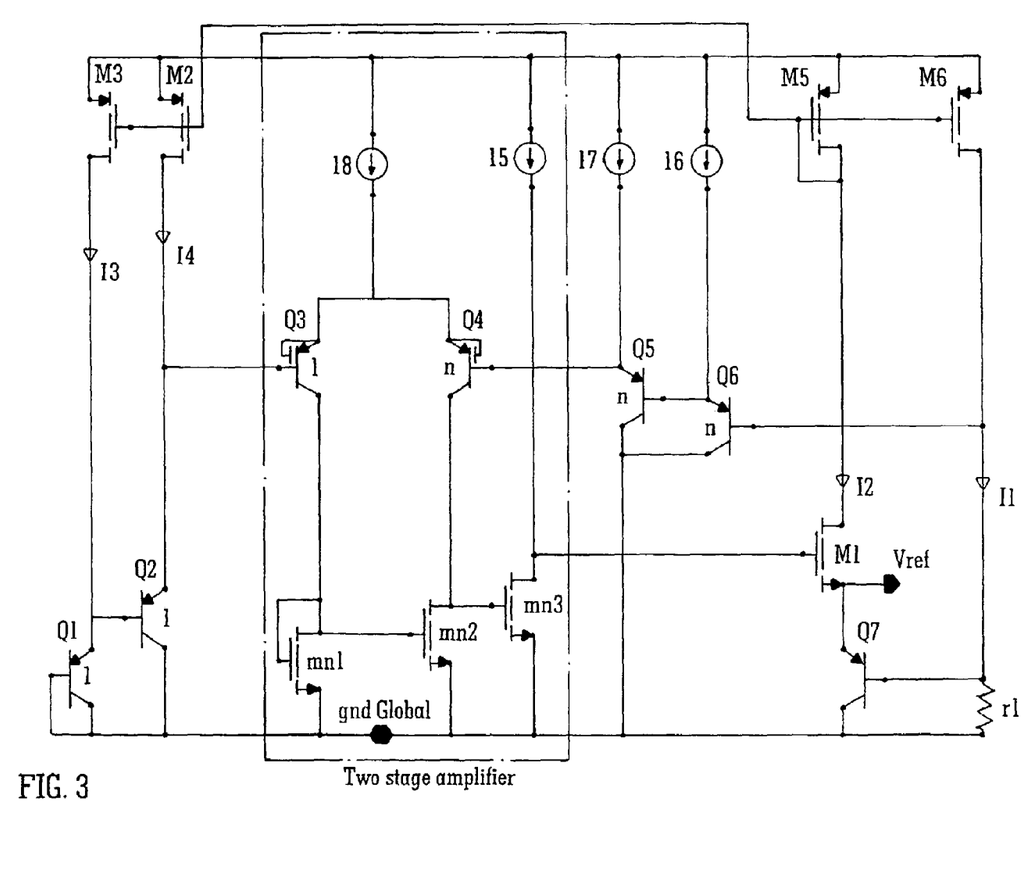
FIG. 3 is an example of a circuit according to a second embodiment of the present invention.

FIG. 3 shows an alternative embodiment of the technique of the present invention. In this embodiment, a two-stage amplifier is provided and the technique of FIG. 2 is implemented using an unbalanced pair of lateral bipolar transistors that provide the first stage of the amplifier. This first stage includes a first transistor Q3 which is provided as a unity emitter area lateral PNP type transistor and a second transistor Q4 of the same type but with an emitter area scaled "n" times that of Q3. Q3 and Q4 are both biased with a PTAT current, I8, which is provided typically from an externally generated current source. The load transistors MN1 and MN2 are adapted to equalise the currents passing through Q3 and Q4. As a result a first $\Delta V_{be}$ is developed into the amplifier's first stage.

The base node of Q3 is equivalent to the non-inverting input of the amplifier shown in FIG. 2 and two transistors Q1 and Q2 are stacked there. The emitter of Q2 is coupled to the base of Q3 and the emitter of Q1 to the base of Q2. The collectors of each of Q1 and Q2 are tied to ground.

Similarly, the base node of Q4 is equivalent to the inverting input of the amplifier shown in FIG. 2 and two transistors Q5 and Q6 are stacked there. The emitter of Q5 is coupled to the base of Q4 and the emitter of Q6 to the base of Q5. The collectors of each of Q5 and Q6 are tied to ground. The emitter areas of each of Q5 and Q6 are scaled "n" times that of Q1 and Q2.

The second stage of the "amplifier" of FIG. 3 is provided by an nMOS transistor MN3 which is driven by a current source I5. The drain of MN3 is also coupled to the gate of M1. The source of M1 is coupled to the emitter of the PNP transistor Q7, and this common node provides the output node Vref for the circuit. The base of Q7 is coupled via resistor, r1, to ground and also to the drain of pMOS transistor M6. The gate of M6 is coupled to the gate of a further pMOS transistor M5 which is provided in a diode connected configuration thereby providing the master component of a current mirror. It will be appreciated that although FIG. 3 shows M5 configured as the master component that alternative arrangements could suitably configure M6 as the master, with M5 as a slave device. However, as illustrated in FIG. 3, the drain of M5 is coupled to the drain of M1, the mirror provided by the combination of M5 and M6 is also coupled to M2 and M3 which are in turn coupled to the emitters of Q2 and Q1 respectively. As such, the PTAT current generated through r1, I1, is mirrored as I2, I3 and I4 thereby driving each of components Q1, Q2, Q3/Q4 and M1 with a PTAT current, whereas components Q5 and Q6 are coupled to an externally provided current source, which desirably provides a predominately CTAT current. As was detailed above the first $\Delta V_{be}$ is developed across Q3 and Q4 and the other two $\Delta V_{be}$'s are developed from Q1 and Q2 to Q5 and Q6.

The 3 $V_{be}(1)$ developed across Q1, Q2, and Q3 and the $3V_{be}(n)$ developed across Q4, Q5 and Q6 are combined, and in a similar fashion to that described with reference to FIG. 2, the output voltage is provided with the curvature component removed. One difference in this implementation from that of FIG. 2 is that both Q3 and Q4 are biased with the same, preferably PTAT, current I8, whereas in the implementation of FIG. 2, one of the transistors forming the third pair is driven with a constant current and the other with a PTAT current. As a result of driving both transistors of the third pair with a current of the same type, the curvature effect is not entirely removed. The effect of the curvature may be minimised by driving Q5 and Q6 with a predominant CTAT current. The driving of Q5 and Q6 with scaled values of PTAT and CTAT current effects a combined output with the curvature inherent to bandgap voltage circuits removed.

Figure 4:
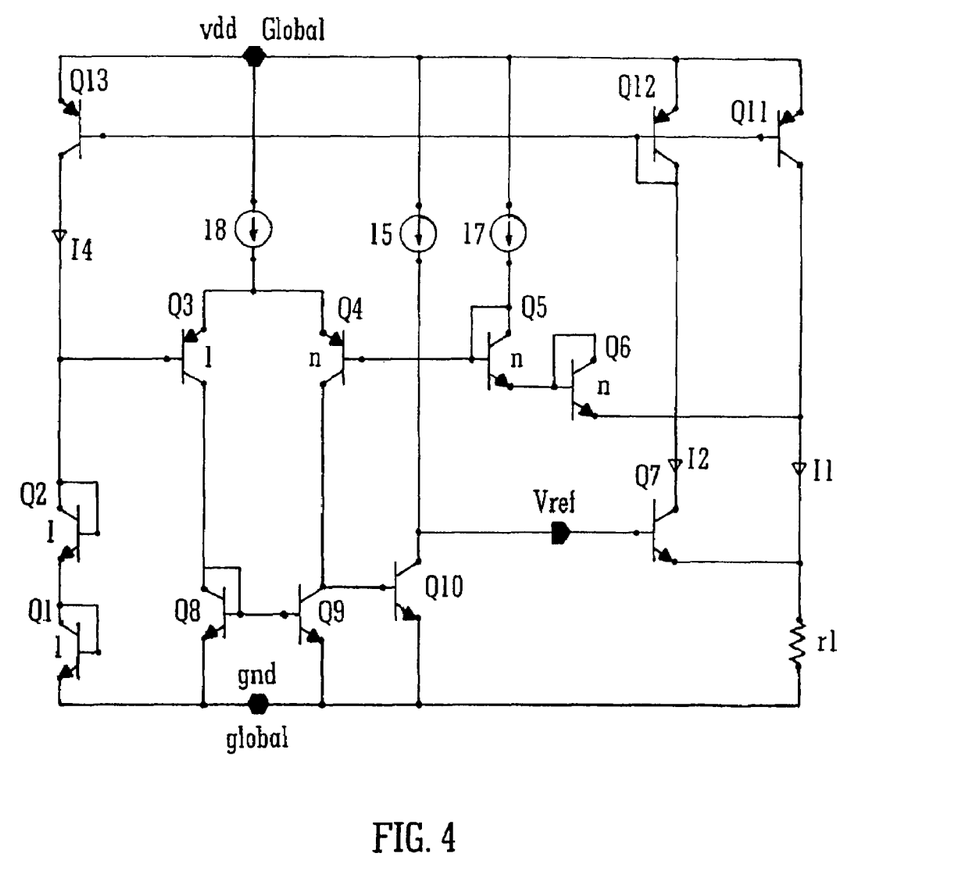
FIG. 4 is an example of a circuit according to a third embodiment of the present invention.

The arrangement of the first stage of the amplifier with one lateral transistor at one side and a large number of lateral transistors (n) on the other side overcomes one major disadvantage or drawback of lateral transistors. This is related to the fact that lateral transistors have two collectors, one tied at the substrate and the other used as the "real" collector. The total collector current is therefore split between the two collectors and the current in the real collector has a large spread for the same emitter current. By using a large number of transistors this effect may be attenuated. It will be appreciated that the circuit of FIG. 3, as it only has two additional transistor provided on the input legs to the amplifier, can be used in applications having lower headroom capabilities; the implementation of two pairs on the input to the amplifier as opposed to the three required in FIG. 2 requires less headroom, yet the circuit still provides the desired $3\Delta V_{be}$ (two external and one into the amplifier input pair). Additionally the circuit of FIG. 3 contributes less 1/f noise than that of FIG. 2 as the input stage of the circuit of FIG. 3 is based on bipolar transistors and in FIG. 2 the input stage is based on MOS transistors FIG. 4 shows a further embodiment in accordance with the present invention. In this embodiment the technique is implemented in a full bipolar arrangement and provides a buffered voltage reference.

Q1 and Q2 are provided in a stack arrangement and are both provided in a diode connected configuration. Similarly, Q5 and Q6 are provided in a diode connected configuration with the base of each coupled directly to their respective collector, the base of Q6 also being coupled to the emitter of Q5. A current I7, which is a constant current source desirably provided as a predominant CTAT current and externally generated, is coupled to this pair of transistors. The first stage of the amplifier is provided by the transistors Q3/Q4/Q8/Q9 with the common emitter of Q3 and Q4 being coupled to an externally generated PTAT current, I8. The collectors of Q3 and Q4 are coupled respectively to the collectors of Q8 and Q9, Q8 being provided in a diode-connected configuration. The collector of Q9 is also coupled to the base of a further transistor, Q10, which provides the second stage of the amplifier. Q10 is also coupled to an externally provided predominately PTAT current, I5. In a similar fashion to the MOS transistors M1, M5 and M6, the bipolar implementation of FIG. 4 provides a bipolar transistor provided as a voltage follower, Q7, whose emitter is coupled to a first transistor, Q11, of a current mirror such that the current I2 generated across r1 is mirrored as I4 by Q13 to drive Q2 and Q1. The transistor Q12 is provided as a master mirror and provides a current I2 coupled to the collector of Q7. The reference voltage of the circuit is provided at a node between Q10 and the base of Q7, and as such is directly tapped from the second stage of the amplifier. It will be appreciated that this configuration has a very low offset sensitivity and sensitivity is reduced as the number (n) of pnp bipolar transistors Q4 is increased.

Figure 5:
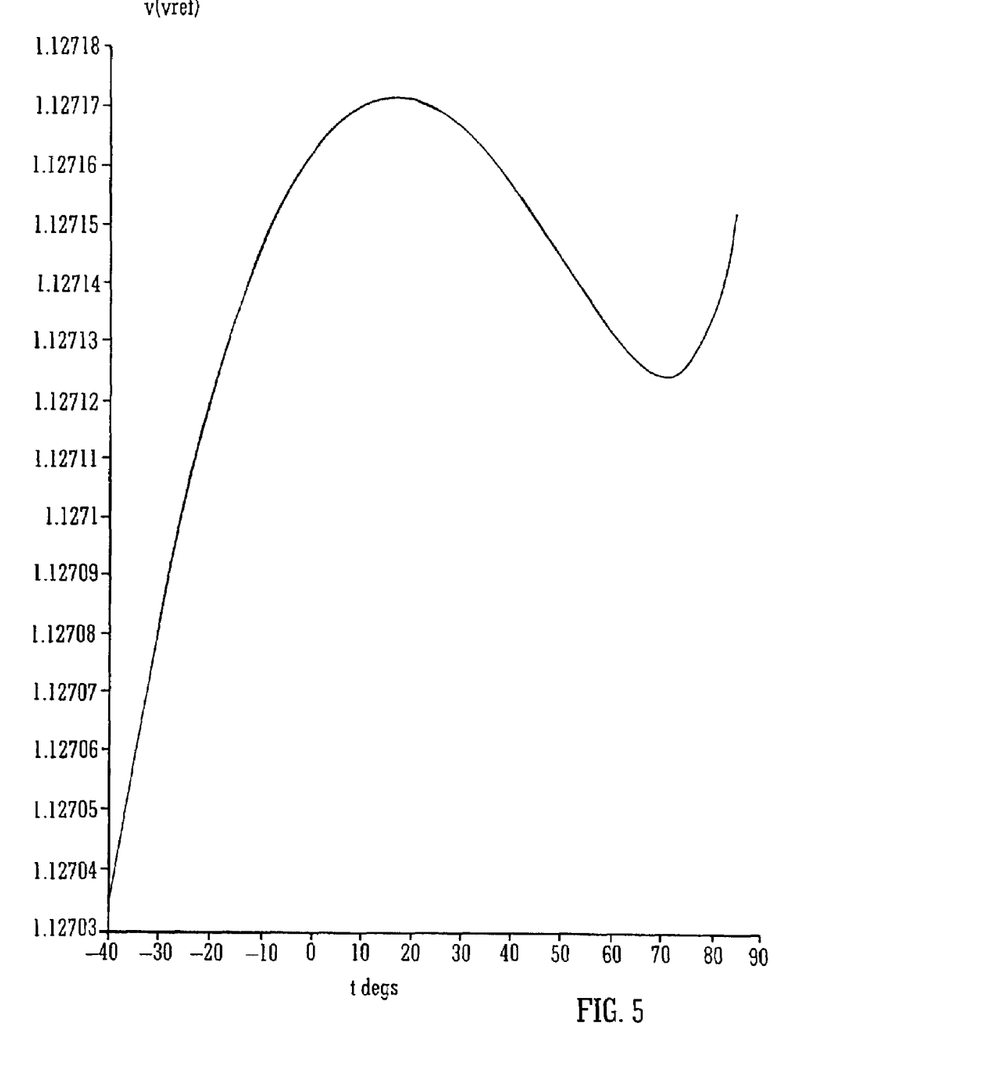
FIG. 5 is a simulation of the performance of the circuit of FIG. 2, showing the output reference voltage.

FIG. 5 shows the result of a simulation using the circuit of FIG. 2. As will be evident from an examination of this result, in the temperature range of −40° C. to about 85° C. (the normal operating conditions of such a reference circuit), the circuit of FIG. 2 shows a total voltage variation of about 0.14 mV which corresponds to a temperature coefficient of about 1 ppm/° C.

It will be appreciated that what has been described herein with reference to three preferred embodiments of the invention, is a bandgap reference circuit that is not dependent on resistor matching or value and has low offset sensitivity and provides for internal curvature correction. By providing enough $\Delta V_{be}$ voltage from three pairs of transistors operating at high current density ratios, and three pairs of transistors operating at low current density ratios, it is not necessary to amplify the $\Delta V_{be}$ and as such any voltage offset inherent in the circuit is also not amplified. The circuits of the present invention provide only one resistor at the output of the amplifier, and as the offset is generated at this resistor, there is therefore no amplification.

The circuit of the present invention uses three pairs of transistors to generate a $\Delta V_{be}$ contribution >120 mV for each pair. It will be appreciated that if the reference is corrected for curvature the nominal bandgap voltage is about 1.15V. If the reference is not compensated for the curvature the nominal voltage is about 1.25V. For the case of the corrected reference a 1.15V voltage at room temperature is based on a contribution of about 700 mV base-emitter voltage (CTAT)

and the difference being provided as a PTAT component. This difference is the required PTAT voltage which is 1.15V−0.7V=0.45V. As a result the required $\Delta V_{be}$ voltage for a pair of bipolar transistors operating at different current density is about 450 mV/3=150 mV. As $\Delta V_{be}$ is generated from an ln(n) component (see equation 1) it is not a simple exercise to get the value >>120 mV by simply scaling the ratios of the transistors operating at different current densities. Each of the transistor pairs requires about 0.8V and in most applications the minimum supply voltage is about 2.6V thereby defining a maximum number of transistors at 3 pairs. To use only 3 $\Delta V_{be}$ and to have the output voltage at a level where the 3$\Delta V_{be}$ has an effect, it is necessary to combine this generation of the 3$\Delta V_{be}$ with a curvature correction mechanism. If curvature correction was not provided then the output voltage would be about 1.25V (the bandgap of silicon) with a bow contribution of about 2.5 mV in the normal operating region. By applying curvature correction, the output voltage is provided without such a bow contribution and as such the contribution provided by the 3 $\Delta V_{be}$ is more significant. It will be understood that in order to implement such a bandgap voltage reference circuit in a single stage environment, ie only having one amplifier, that it is necessary to apply some curvature correction or the voltage generated by the stacks of transistors will not be sufficient to compensate.

It will be appreciated that the invention utilises an amplifier having at its non-inverting input a first stack of bipolar transistors operating at first current density and provides in a feedback loop between the output of the amplifier and its inverting input, a second stack of bipolar transistors operating at second current density lower then that of first stack. Due to the difference in current density of the two stacks an enhanced $\Delta V_{be}$ is reflected at the output of the amplifier. This PTAT voltage is developed across a resistor coupled to the output of the amplifier and to a reference potential, typically ground. If this PTAT voltage is added to a balanced CTAT voltage, a voltage reference insensitive to the temperature is provided. However, if the PTAT voltage is not superimposed or combined with a balanced CTAT voltage then the voltage developed across the resistor is not temperature insensitive—the $\Delta V_{be}$ voltage is directly related to temperature fluctuations (see equation 1)—and as such the circuit may be used to provide a temperature sensor.

Figure 6:
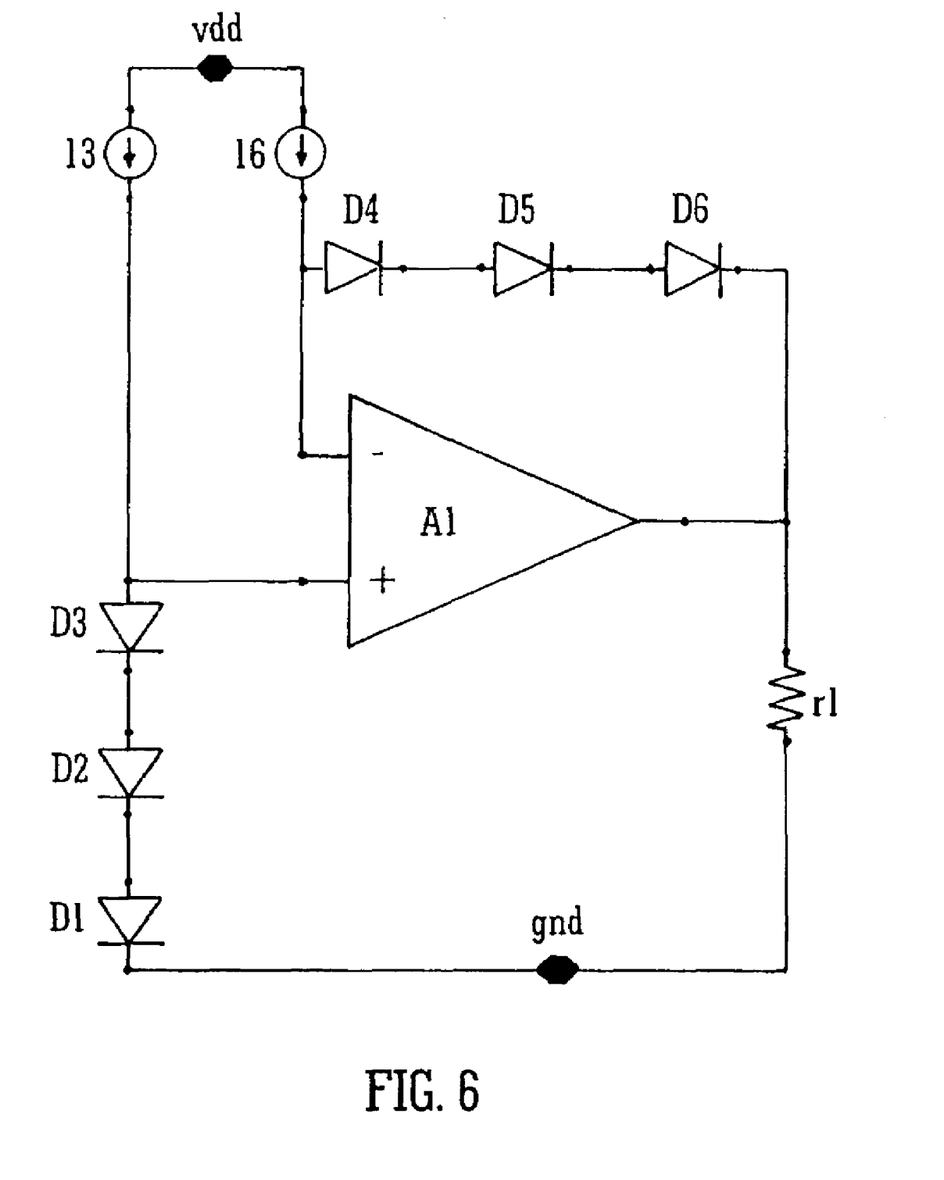
FIG. 6 is a schematic showing the implementation of the invention using diode stacks.

FIG. 6 shows a simplified schematic of how such a circuit could be provided in accordance with the present invention to provide a voltage reference (i.e. insensitive to temperature fluctuations) and a temperature sensor (i.e. giving an output value related to the on-chip temperature). An amplifier is provided having an inverting and non-inverting input. At the output of the amplifier a resistor, r1, is provided: coupled between the output of the amplifier and ground. A first stack of diodes (D1, D2, D3) is provided and coupled to the non-inverting input of the amplifier. This first stack or chain is driven with a current, I3, which is desirably a PTAT current. A second chain of diodes is provided in a feedback loop between the inverting input and the output of the amplifier. This chain is driven with a second current, I6, is adapted to operate at second current density lower then that of first stack. It will be appreciated that equivalently bipolar transistors, suitably configured, could be used instead of the diodes mentioned and illustrated.

In use, if the circuit is to be used a temperature insensitive voltage reference then it is important to remove any curvature components that are intrinsic to bandgap voltage circuits. It will be appreciated that a CTAT voltage provides a positive curvature contribution which can be obviated by combining such a CTAT voltage with a negative curvature component of a PTAT voltage.currents. This may be created by providing the second current, I6, as a constant current source, such that when CTAT and PTAT voltages are added, the curvature component of each cancelling the other out.

If the circuit is to be used as temperature sensor then it is important that the temperature variance of the $\Delta V_{be}$ voltage is not compensated. The easiest way for this to be effected is to provide I6 also as a PTAT current, and desirably having I3=I6. It will be appreciated that in the implementation as a temperature sensor that the number of the diodes in each chain could be 1, 2, 3 or greater depending by the required nominal PTAT voltage. It will be understood that when the circuit is used as a temperature insensitive voltage reference that it is important when balancing the PTAT current with an equivalent CTAT current that the $\Delta V_{be}$ generated is of a suitably high enough value. However, in instances where the circuit is used as a temperature sensor this is not so critical and the number of diodes or bipolar transistors in each chain can be chosen depending on the application. It will be further understood that when used in temperature sensor implementations that if the two currents, I3 and I6, are externally generated that the requirement for the resistor r1 is obviated. Due to the provision of the diodes in the feedback loop one or more multiples of $\Delta V_{be}$ (depending on the number of diodes in each stack) will still be generated at the output of the amplifier, thereby providing the necessary signal for monitoring the temperature.

It will be understood that the present invention has been described with reference to a specific PNP configuration of bipolar transistors and that it is not intended that the application of the invention be limited to such configurations. As will be understood by the person skilled in the art many modifications and variations in configurations may be achieved by implementation in NPN architectures or the like. Similarly, where transistors are provided in an nMOS or pMOS configuration it will be appreciated that modifications can be made to change which transistors are provided in each configuration without departing from the spirit and scope of the invention. Furthermore where the invention is described in a bipolar implementation it will be appreciated that such an implementation can be provided using CMOS processes by using parasitic components and the like. It will be appreciated that has been described herein is an exemplary embodiment of a bandgap voltage reference in accordance with the present invention. Specific components, features and values have been used to describe the circuit in detail but it is not intended that the present invention be limited in any way whatsoever except as may be deemed necessary in the light of the appended claims.

Similarly, the words comprises/comprising when used in this specification are to specify the presence of stated features, integers, steps or components but does not preclude the presence or addition of one or more other features, integers, steps, components or groups thereof.

The invention claimed is:

1. A temperature reference circuit including an amplifier having at its non-inverting input node at least one first bipolar transistor operable at a first current density and in a feedback loop between the output of the amplifier and its inverting input node, at least one second bipolar transistor operable at a second current density lower than that of the first transistor, such that due to the difference in current density of the first and second transistors coupled to each of the two inputs of the amplifier a $\Delta V_{be}$ is reflected at the output of the amplifier such that a PTAT signal is available at the output of the amplifier, and wherein the transistors coupled to each of the input nodes of the amplifier are driven with PTAT currents such that the $\Delta V_{be}$ voltage developed is temperature sensitive, thereby providing a voltage reference circuit adapted to provide a measurement of temperature.

2. The circuit as claimed in claim 1 wherein two or more transistors are provided in a stack arrangement coupled to each of the input nodes of the amplifier, the difference in current density between the transistors in each stack generating an enhanced $\Delta V_{be}$ at the output of the amplifier.

3. The circuit as claimed in claim 1 wherein the PTAT currents are generated externally to the circuit.

4. The circuit as claimed in claim 1 wherein the PTAT currents are generated internally within the circuit, the $\Delta V_{be}$ being developed across a sole resistor coupled between the output of the amplifier and a reference potential.

5. The circuit as claimed in claim 2 wherein the enhanced $\Delta V_{be}$ is developed as a PTAT voltage across a sole resistor coupled between the output of the amplifier and a reference potential.

6. A temperature reference circuit including an amplifier having first and second input nodes, and providing a reference voltage at an output thereof, the circuit additionally including at least three pairs of transistors, each pair having a first transistor adapted to operate at a different current density to that of a second transistor of the pair, such that, in use, a difference in base emitter voltages, $\Delta V_{be}$, between the two transistors of each pairing is generated and wherein the pairs are arranged such that those transistors having a first current density are provided in a chain coupled to the first input node and those transistors having the second current density are provided in a chain coupled to the second input node, the combination of the $\Delta V_{be}$ provided by each pairing contributing to an enhanced $\Delta V_{be}$ equal to at least 3 $\Delta V_{be}$ at the output of the amplifier, the enhanced $\Delta V_{be}$ being generated across a resistor provided at the output of the amplifier and wherein each of first and second chains of the transistors are driven with a Proportional to Absolute Temperature (PTAT) current, the at least 3 $\Delta V_{be}$ being applied across the resistor on the output of the amplifier, thereby providing at an output node a voltage indicative of the temperature on the device.

7. The circuit as claimed in claim 6 wherein each of the transistors are provided in a MOS process implementation.

8. The circuit as claimed in claim 6 wherein two of the pairs of transistors are formed using bipolar transistors and the third pair is formed using lateral transistors.

9. The circuit as claimed in claim 8 wherein the third pair provides an input stage of the amplifier.

10. The circuit as claimed in claim 9 wherein the third pair provides an asymmetric input stage of the amplifier.

11. The circuit as claimed in claim 7 further including a pair of load transistors coupled to the third pair of transistors, the load transistors being adapted to equalise the currents through the third pair of transistors.

12. The circuit as claimed in claim 7 wherein the third pair of transistors are both driven with a PTAT current.

13. The circuit as claimed in claim 12 wherein the PTAT current provided is generated externally to the circuit.

14. The circuit as claimed in claim 11 wherein a second stage of the amplifier is provided by a MOS transistor which is driven by a PTAT current source, the MOS transistor being coupled to one of the load transistors and the collector of one of the transistors forming the third pair of transistors.

15. The circuit as claimed in claim 6 further including a MOS transistor provided at the output of the amplifier, the MOS transistor being driven with a PTAT current, the base of the MOS transistor being coupled directly to the output node of the amplifier and the emitter node providing an output of the circuit.

16. The circuit as claimed in claim 15 wherein the source of the MOS transistor is coupled to the emitter of a bipolar transistor, the collector of the bipolar transistor is coupled to a reference potential, and the base of the bipolar transistor is coupled to the resistor.

17. The circuit as claimed in claim 6 wherein each of the three pairs of transistors are provided in a bipolar configuration, the third pair providing an input stage of an amplifier, the amplifier having an output node coupled to a bipolar transistor provided in a voltage follower configuration, and wherein the voltage reference is provided at a node between the output of the amplifier and the voltage follower.

* * * * *